United States Patent [19]

Kamo et al.

[11] Patent Number: 5,547,756
[45] Date of Patent: Aug. 20, 1996

[54] POROUS POLYPROPYLENE HOLLOW FIBER MEMBRANE OF LARGE PORE DIAMETER, PRODUCTION PROCESS THEREOF, AND HYDROPHILIZED POROUS HOLLOW FIBER MEMBRANES

[75] Inventors: Jun Kamo; Takayuki Hirai; Hiroshi Takahashi; Kenji Kondou, all of Otake, Japan

[73] Assignee: Mitsubishi Rayon Co., Ltd., Tokyo, Japan

[21] Appl. No.: 430,290

[22] Filed: Apr. 28, 1995

Related U.S. Application Data

[60] Continuation of Ser. No. 46,185, Apr. 14, 1993, abandoned, which is a division of Ser. No. 831,922, Feb. 6, 1992, Pat. No. 5,232,642.

[30] Foreign Application Priority Data

| Feb. 8, 1991 | [JP] | Japan | 3-037800 |
| Aug. 20, 1991 | [JP] | Japan | 3-207791 |
| Aug. 21, 1991 | [JP] | Japan | 3-209092 |

[51] Int. Cl.⁶ .................................................. B32B 27/00
[52] U.S. Cl. .......................... 428/394; 428/398; 428/401
[58] Field of Search ........................ 428/394, 398, 428/401

[56] References Cited

U.S. PATENT DOCUMENTS

| 4,695,592 | 9/1987 | Itoh et al. | 521/54 |
| 4,859,535 | 8/1989 | Shinomura et al. | 428/398 |

FOREIGN PATENT DOCUMENTS

86/93227  6/1986  WIPO .......................... B01D 13/04

*Primary Examiner*—Christopher Raimund
*Attorney, Agent, or Firm*—Oblon, Spivak, McClelland, Maier, & Neustadt, P.C.

[57] ABSTRACT

Disclosed is a porous polypropylene hollow fiber membrane of large pore diameter which have (a) rectangular pores formed by microfibrils that are oriented in the lengthwise direction of the fibers and joint portions that are composed of stacked lamellae, the pores being contiguous with each other from the inner wall surface to the outer wall surface of the hollow fiber membrane to form a stacked, multicellular structure, (b) an average pore diameter ranging from 1.7 μm up to 10 μm as measured with a mercury porosimeter, (c) a porosity of 80 to 95%, and (d) an air permeability of not less than $4 \times 10^5$ l/m².hr.0.5 atm. This hollow fiber membrane can be produced by melt-spinning polypropylene, annealing the resulting unstretched hollow fiber under specific conditions, and then cold-stretching and hot-stretching the annealed hollow fiber under specific conditions.

14 Claims, No Drawings

POROUS POLYPROPYLENE HOLLOW FIBER MEMBRANE OF LARGE PORE DIAMETER, PRODUCTION PROCESS THEREOF, AND HYDROPHILIZED POROUS HOLLOW FIBER MEMBRANES

This application is a Continuation of application Ser. No. 08/046,185, filed on Apr. 14, 1993, now abandoned—which is a Divisional of Ser. No. 07/831,922, filed on Feb. 6, 1992 now U.S. Pat. No. 5,232,642.

BACKGROUND OF THE INVENTION

1. Field of the Invention

This invention relates to porous polypropylene hollow fiber membranes having a large pore diameter and a high porosity and hence suitable for use in fields of application requiring a very high filtering flux, such as precision filtration and air cleaning, a process for the production of such hollow fiber membranes, and hydrophilized porous polypropylene hollow fiber membranes.

2. Description of the Prior Art

Porous hollow fiber membranes consisting of polypropylene and having a membrane structure formed from stacked rectangular pores are conventionally known, and the details thereof are disclosed, for example, in Japanese Patent Laid-Open Nos. 15627/'77 and 2849/'90. It is disclosed in the former that porous hollow fiber membranes having characteristic rectangular pores and exhibiting a pore diameter distribution curve having at least one maximum within the range of 200 to 1,200 angstroms can be produced by melt-spining polypropylene at a spinning temperature of 210° to 270° C. and a spinning draft of 180 to 600, heat-treating the spun hollow fibers at a temperature of 155° C. or below, stretching them by 30 to 200% at a temperature lower than 110° C., and heat-treating them again at a temperature ranging from the aforesaid heat-treating temperature to 155° C. It is disclosed in the latter that porous polypropylene hollow fiber membranes having a group of rectangular pores whose diameter is within the range of 0.1 to 1.0 μm as measured by the bubble point method can be produced by stretching melt-spun polypropylene hollow fibers in liquid nitrogen and then at a high temperature (110° to 155° C.), or by stretching melt-spun polypropylene hollow fibers at a high temperature (120° to 145° C.) until an amount of stretching of 100 to 700% is attained and then heat-treating them at a temperature of 115° to 155° C.

Thus, porous hollow fiber membranes consisting of polypropylene and having rectangular pores whose average diameter exceeds 1.0 μm have not been available in the prior art.

Generally, porous membranes are broadly divided into hydrophilic membranes and hydrophobic membranes according to the properties of the material. Known examples of hydrophilic porous membranes include cellulose, cellulose derivatives, polyvinyl alcohol, ethylenevinyl alcohol copolymers and the like. Hydrophilic porous membranes are characterized by the fact that, since the pore surfaces thereof are hydrophilic, they are easily wettable with water and permit the filtration of aqueous solution without any special pretreatment.

However, hydrophilic membranes have the disadvantage that, when they are in the wet state, they show a reduction in mechanical strength and that they undergo a high degree of swelling with water. Moreover, hydrophilic membranes have the additional disadvantage that, when they are dried from the wet state, they are reduced in membrane properties and are liable to deteriorate.

On the other hand, when hydrophobic porous membranes are used as they are, water cannot easily permeate therethrough. Accordingly, a hydrophilizing treatment is required in order to enable hydrophilic liquids including water to permeate therethrough. A variety of methods have been studied especially in connection with hydrophilization by surface modification of polyolefin membranes. It is to be noted, however, that hydrophilizing methods which have been proposed for film-like materials having smooth surfaces cannot be simply applied to the hydrophilization of porous membranes having complex surface configurations.

Well-known methods for hydrophilizing porous polyolefin membranes include the organic solvent wetting and water substituting method in which the entire surfaces, inclusive of pore surfaces, of a porous polyolefin membrane are subjected to a wetting treatment with an organic solvent having good miscibility with water, such as an alcohol and ketone, followed by substitution of water for the organic solvent; the physical adsorption method in which a hydrophilic material such as polyethylene glycol or a surfactant is adsorbed on the surfaces of a porous membrane to impart hydrophilicity to the porous membrane (Japanese patent Laid-Open Nos. 153872/'79 and 24732/'84); and the chemical surface modification methods in which a hydrophilic monomer is held on the surfaces of a porous film and then exposed to radiation (Japanese patent Laid-Open No. 38333/'81) or a porous structure consisting of a hydrophobic resin is subjected to a plasma treatment (Japanese Patent Laid-Open No. 157437/'81).

In the organic solvent wetting and water substituting method, however, it is always necessary to keep water around the porous membrane and, therefore, its handling is troublesome. The reason for this is that, once water is lost from pores during storage or use, the part having such water-free pores regains hydrophobicity and no longer permits the permeation of water therethrough. Although the physical adsorption method is simple in operation, the hydrophilic material may come off while the porous membrane is used for a long period of time. Therefore, this method cannot be regarded as a fully satisfactory hydrophilizing method. Moreover, the conventional chemical surface modification methods are also disadvantageous. Whether a porous membrane is exposed to radiation or subjected to a plasma treatment, it is difficult to hydrophilize the membrane uniformly in the direction of its thickness. If it is attempted to effect uniform hydrophilization over the entire thickness of a porous membrane which has a large thickness or is in the form of hollow fibers, the matrix of the porous membrane is unavoidably damaged or reduced in mechanical strength.

It has also been proposed to hydrophilize a hydrophobic porous membrane by previously treating it with a saponification product of an ethylene-vinyl acetate copolymer, i.e., an ethylene-vinyl alcohol polymer (Japanese Patent Laid-Open Nos. 125408/'86 and 271003/'86).

It has also been proposed to produce hydrophilic porous hollow fiber membranes having hydrophilized pore surfaces, by melt spinning a blend of two different polymers, stretching the spun fibers to cleave the interfaces between the different polymers, and then subjecting the resulting microporous hollow fiber membranes to an after-treatment such as hydrolysis or sulfonation of the side-chain groups present in the constituent polymers (Japanese Patent Laid-Open No. 137208/'80).

In addition, there have been proposed porous polyolefin membranes having a hydrophilic polymer held firmly on the pore surfaces thereof, and a production process thereof (Japanese Patent Laid-Open No. 190602/'88). More specifically, this patent provides hydrophilic porous membranes comprising porous polyolefin membranes having a hydrophilic crosslinked polymer, which is composed of monomers including diacetone acrylamide and a crosslinkable monomer, held on at least a part of the pore surfaces thereof. Such hydrophilic porous membranes can be produced by holding monomers including diacetone acrylamide and a crosslinkable monomer on at least a part of the pore surfaces of a porous polyolefin membrane, and then polymerizing them by the application of heat.

However, since all of these methods use a conventional porous polyolefin membrane as the starting material, the performance of the resulting hydrophilized porous membranes is insufficient for fields of application requiring a high permeation flow rate. That is, in order to obtain a hydrophilized porous membrane having a high permeation flow rate, an increase in the pore diameter and porosity of the starting hydrophobic porous membrane needs to be considered in combination with hydrophilization.

In the fields of precision filtration and air cleaning which require a very high filtering flux, membranes and nonwoven fabrics having a pore diameter of the order of microns and a high porosity are being used. Porous hollow fiber membranes having rectangular pores are characterized by the fact that, as described in Japanese Patent Publication No. 35726/'88, they have high permeability to gases and liquids and they are less liable to clogging because of their membrane structure formed from stacked rectangular pores. However, the performance of such porous hollow fiber membranes having rectangular pores is still insufficient for fields of application requiring a very high filtering flux and a low pressure loss, such as bacteria-free and dust-free air filters, dust-removing filters for various gases, and sterile water filters. The reason for this is that their pore diameter is too small and their porosity is too low for use in such fields.

On the other hand, hydrophilizing treatment with an alcohol or a surfactant provides only temporary hydrophilization. Moreover, if a porous membrane having such a hydrophilizing agent attached thereto is used for filtering or other purposes, the alcohol or surfactant migrates to and contaminates the purified water. Accordingly, it is necessary to wash off the hydrophilizing agent thoroughly before use. On this occasion, the pore surfaces regain hydrophobicity if the porous membrane is dried. Thus, once the porous membrane is hydrophilized, it is necessary to replace the hydrophilizing agent with water and thereby keep its pore surfaces in contact with the water.

The method described in Japanese Patent Laid-Open No. 38333/'81 can provide permanent hydrophilization, because the groups developing hydrophilicity are chemically fixed to the porous membrane. However, the need of exposure to ionizing radiation requires large-scale equipment, provides rather low process stability, and involves a risk of causing damage to the membrane material. Thus, it is difficult to manage and control the process steps.

In the method described in Japanese Patent Laid-Open No. 137208/'80, the hollow fiber membranes produced by melt spinning a blend of different polymers and then stretching the spun fibers to make them porous generally have a low porosity. Moreover, this method requires an after-treatment for hydrophilization, such as hydrolysis or sulfonation, which makes the process complicated.

Moreover, even if the technique of Japanese Patent laid-Open No. 38333/'81 is applied to the hollow fiber membranes of Japanese Patent Publication No. 35726/'88, the resulting hydrophilized hollow fiber membranes have only a submicron pore diameter. With respect to pore diameter, the techniques disclosed in the hydrophilic composite porous membranes of Japanese Patent Laid-Open Nos. 125408/'86 and 271003/'86 never exceed the technical level of the aforementioned Japanese Patent Publication No. 35726/'88 or the like. In fact, the hollow fiber membranes obtained in the Examples of those patents had an average pore diameter of 0.25 to 0.70 μm.

Furthermore, Japanese Patent Laid-Open No. 190602/'88 discloses hydrophilic porous membranes comprising porous polyolefin membranes having a hydrophilic crosslinked polymer, which is composed of monomers including diacetone acrylamide and a crosslinkable monomer, held on the pore surfaces thereof.

However, the performance of these porous membrane having a crosslinked polymer held on the surfaces of rectangular pores is still insufficient for fields of application requiring a very high filtering flux and a low pressure loss, such as the filtration of aqueous solutions and aqueous suspensions, the preparation of purified water for use in electronic industry and the like, and the sterilization of raw water for use in the manufacture of pharmaceutical preparations. The reason for this is that its pore diameter is too small and its porosity is too low for use in such fields. If permanent hydrophilicity could be imparted to a porous hollow fiber membrane exhibiting a membrane structure formed from stacked rectangular pores capable of providing excellent filtering efficiency and, moreover, having a large pore diameter and a high porosity, great contributions would be made to frontier industrial fields through achievement of energy saving and creation of an ultraclean environment.

SUMMARY OF THE INVENTION

It is an object of the present invention to provide a porous polypropylene hollow fiber membrane which exhibits a membrane structure formed from stacked rectangular pores, has a high porosity and a large pore diameter, and can achieve a high air permeability.

It is another object of the present invention to provide porous polypropylene hollow fiber membrane which exhibits permanent hydrophilicity and has a high porosity and a large pore diameter.

According to one aspect of the present invention, there is provided a porous polypropylene hollow fiber membrane of large pore diameter which consists of polypropylene, the hollow fiber membrane having:

(a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;

(b) an average pore diameter ranging from greater than 1 μm up to 10 μm as measured with a mercury porosimeter;

(c) a porosity of 70 to 95%; and (d) an air permeability of not less than $4 \times 10^5$ $l/m^2 \cdot hr \cdot 0.5$ atm.

According to another aspect of the present invention, there is provided a process for the production of a porous polypropylene hollow fiber membrane of large pore diameter having the above-described properties which comprises the steps of melt-spinning polypropylene with a nozzle for forming hollow fibers, annealing the resulting unstretched hollow fiber, and then cold-stretching and hot-stretching the annealed hollow fiber to make it porous, the process being characterized in that the unstretched hollow fiber is annealed at a temperature of 120° to 165° C. for 30 minutes or more, the deformation rate during hot stretching is not greater than 10% per second, and the total amount of stretching is within the range of 700 to 2,500%.

According to still another aspect of the present invention, there is provided a hydrophilized porous polypropylene hollow fiber membrane comprising the above-described porous polypropylene hollow fiber membrane of large pore diameter having a saponification product of an ethylene-vinyl acetate copolymer held on at least a part of the pore surfaces thereof.

According to a further aspect of the present invention, there is provided a hydrophilized porous polypropylene hollow fiber membrane comprising the above-described porous polypropylene hollow fiber membrane of large pore diameter having a hydrophilic crosslinked polymer held on at least a part of the pore surfaces thereof, the hydrophilic crosslinked polymer being formed by polymerizing monomers including diacetone acrylamide and a crosslinkable monomer.

DETAILED DESCRIPTION OF THE PREFERRED EMBODIMENTS

The polypropylene used in the present invention preferably comprises isotactic polypropylene or syndiotactic polypropylene. By melt-spinning this polypropylene under specific conditions and then stretching the spun hollow fibers under specific conditions, there are obtained porous hollow fiber membranes in which pores having a relatively large diameter are contiguous with each other from the inner wall surface to the outer wall surface of the hollow fiber membranes.

The polypropylene used in the present invention preferably has a melt index (MI) of 0.1 to 10 as measured according to the procedure described in ASTM D-1238. More preferably, the melt index is within the range of 0.3 to 8. If a polypropylene having a melt index of greater than 10 is used, it is difficult to stretch the spun fibers until a total amount of stretching of 700% or greater is attained, and it is consequently difficult to obtain a porous hollow fiber membrane having a large pore diameter and a high porosity in accordance with the present invention. If a polypropylene having a melt index of less than 0.1 is used, its melt viscosity is so high that it is difficult to spin the polypropylene stably. It is an important point of the present invention to use a polypropylene having a high molecular weight within a range which permits stable spinning.

In the present invention, a polypropylene as described above is melt-spun using a nozzle for forming hollow fibers to produce unstretched hollow fibers which are highly oriented and highly crystallized. Although a nozzle of double-tubular construction is preferred because it can give a substantially uniform section, a nozzle of horse-shoe shape or other construction may also be used. Where a nozzle of double-tubular construction is used, the air introduced into the hollow fiber to maintain its hollow form may be supplied spontaneously or forcedly.

In order to obtain the porous hollow fiber membranes of the present invention stably, it is desirable that the spinning temperature be 20° to 150° C. higher than the melting point of the polymer. If the spinning is carried out at a temperature lower than this temperature range, the polymer does not melt completely and is liable to melt fracture, resulting in a deterioration of stability in the stretching step. On the contrary, if the spinning is carried out at a temperature higher than this temperature range, it is difficult to obtain a porous hollow fiber membrane having a large pore diameter and a high porosity.

The polymer extruded at a suitable spinning temperature is preferably taken up at a spinning draft of 5 to 5,000. If the spinning draft is greater than 5,000, the resulting unstretched hollow fibers cannot be stretched until a total amount of stretching of 700% or greater is attained. If the spinning draft is less than 5, the resulting unstretched hollow fibers are not highly oriented and cannot be made porous by stretching.

The resulting unstretched hollow fibers are highly oriented in the lengthwise direction of the fibers, and have an inner diameter of 100 to 2,000 μm and a wall thickness of about 15 to 800 μm. These unstretched hollow fibers are heat-treated at a temperature of 120° to 165° C., preferably 130° to 155° C., prior to stretching. The necessary heat-treating (or annealing) time is 30 minutes or more. This annealing yields a more perfect crystal structure, so that an elastic recovery factor of 50% or greater is achieved after the hollow fibers are stretched by 50%.

In the process of the present invention, the stretching is carried out in two stages consisting of cold stretching followed by hot stretching. In cold stretching, it is preferable to fix the stretching points so as to destroy the crystal structure and produce microcrazes uniformly. Moreover, it is desirable to carry out the cold stretching at a high stretching speed which provides a deformation rate of not less than 40% per second. Furthermore, it is also desirable to employ a cold-stretching temperature of 80° C. or below so as to destroy the crystal structure without relaxation and thereby produce microcrazes.

After the hollow fibers are cold-stretched in the above-described manner until an amount of stretching of about 5 to 150% is attained, they are hot-stretched at a temperature within the range of 120° to 165° C. If the hot-stretching temperature is higher than this range, the hollow fiber membrane become transparent and the desired porous structure can hardly be obtained. If the hot-stretching temperature is lower than 120° C., the porous structure becomes finer and gives a lower porosity, making it impossible to obtain the desired hollow fiber membrane having a large pore diameter. Moreover, it is a very important point of the present invention to adjust the deformation rate during hot stretching to not greater than 10% per second. If the deformation rate is greater than 10% per second, it is practically impossible to achieve a total amount of stretching of 700% or greater. The total amount of stretching should be within the range of 700 to 2,500%. If the total amount of stretching exceeds 2,500%, the hollow fibers are frequently broken during the stretching operation, resulting in a deterioration of process stability. If the total amount of stretching is less than 700%, a porous structure is created, but a hollow fiber membrane having a large pore diameter and a high porosity in accordance with the present invention cannot be obtained. A total amount of stretching of 700% or greater and preferably 1,000% or greater is also indispensable for the purpose of achieving a porosity of 70% or greater.

The term "deformation rate" as used herein means a value obtained by dividing the amount of stretching (in %) in a stretching section by the time (in seconds) required for the hollow fiber to pass through the stretching section.

The resulting porous hollow fibers have a substantially stabilized shape as a result of the hot stretching, and do not necessarily require a thermal setting step for fixing the porous structure. If desired, however, they may be thermally set under constant-length conditions under tension or relaxed conditions in the same temperature range as employed for the above-described hot stretching.

The porous polypropylene hollow fiber membranes of large pore diameter obtained in the above-described manner are characterized by an average pore diameter ranging from 1.7 µm up to 10 µm, preferably from 1.8 to 10 µm, as measured with a mercury porosimeter, a porosity of 70 to 95%, and an air permeability of not less than $4\times10^5$ $l/m^2.hr.0.5$ atm. Moreover, these hollow fiber membranes have characteristic rectangular pores formed by microfibrils that are oriented in the lengthwise direction of the fibers and joint portions that are composed of stacked lamellae, the pores being contiguous with each other from the inner wall surface to the outer wall surface of the hollow fiber membrane to form a stacked, multicellular structure. The microfibrils have an average length ranging from greater than 1 µm up to 15 µm.

One type of hydrophilized porous hollow fiber membranes in accordance with the present invention can be obtained by holding a saponification product of an ethylene-vinyl acetate copolymer (hereinafter referred to briefly as the "saponification product") on at least a part of the pore surfaces of a porous polypropylene hollow fiber membrane of large pore diameter having the above-described properties. In the hydrophilized porous hollow fiber membrane of the present invention, the saponification product held on the porous polypropylene hollow fiber membrane serving as the matrix imparts good hydrophilicity thereto, without impairing their desirable properties, i.e., its large pore diameter, high porosity and sufficiently high mechanical strength. Accordingly, the hydrophilized porous hollow fiber membranes of the present invention has excellent permeability to aqueous liquids and are especially suitable for high flow velocity treatment. Moreover, they have the advantage of being less liable to clogging because the porous polypropylene hollow fiber membranes have the above-described unique membrane structure formed from rectangular pores.

In the hydrophilized porous hollow fiber membranes of the present invention, the term "at least a part of the pore surfaces" of the starting porous hollow fiber membrane, on which a polymer is held, means a part or the whole of the wall surfaces forming the pores. More specifically, the polymer has only to be held on the wall surfaces of the pores to such an extent that a sufficient permeation flow rate is obtained when water is allowed to permeate through the pores of the hollow fiber membrane under a commonly employed transmembrane pressure difference. it is not always necessary to cover the whole wall surfaces of the pores with the polymer. The polymer need not be held on the outer surfaces of the porous hollow fiber membrane.

The term "held" as used herein means that the polymer is firmly bound or attached to the wall surfaces forming the pores to such a degree as not to come off easily during storage or use. Accordingly, the polymer may be chemically bonded to the wall surfaces, attached thereto by an anchoring effect, adherently crosslinked so as to enclose the microfibrils and joint portions forming the rectangular pores, or may be present in a combination of these manners of holding.

Thus, the manner in which the polymer is held on the wall surfaces forming the pores of the starting hollow fiber membrane can be any of the above-described manners of holding. However, hydrophilized porous hollow fiber membranes in which the polymer is physically held on the wall surfaces (for example, by anchorage or adherent crosslinking) instead of being chemically bonded thereto are especially preferred because they show little deterioration of mechanical strength and little change of the pore structure as compared with the starting hollow fiber membrane constituting the matrix.

In the present invention, there may be employed various methods for holding the saponification product on at least a part of the pore surfaces of a porous polypropylene hollow fiber membrane serving as the matrix. They include, for example, a method which comprises introducing the saponification product directly into the pores of the porous polypropylene hollow fiber membrane and holding it on the pore surfaces, and a method which comprises introducing an ethylene-vinyl acetate copolymer into the pores of the porous polypropylene hollow fiber membrane, holding it on the pore surfaces, and then saponifying it.

The ethylene-vinyl acetate copolymer used to form the saponification product can be any of various types of copolymers such as random copolymers, block copolymers and graft copolymers. The type of the saponification product depends on the type of the ethylene-vinyl acetate copolymer used. Although the ethylene-vinyl acetate copolymer is basically composed of ethylene and vinyl acetate, other monomer components may also be present in such amounts as not to impair the desired properties.

The content of ethylene units in the ethylene-vinyl acetate copolymer is important in that it affects the adhesion of the ethylene-vinyl acetate copolymer and its saponification product to polypropylene. From the viewpoint of such adhesion, the content of ethylene units is preferably not less than 20 mole %. If the content of ethylene units is less than 20 mole %, the ethylene-vinyl acetate copolymer or its saponification product, when deposited on the pore surfaces of a porous polypropylene hollow fiber membrane, fails to have good adhesion and tends to come off. On the other hand, if the content of ethylene units is too high, the finally obtained saponification product fails to impart good hydrophilicity to a porous polypropylene hollow fiber membranes. Accordingly, the content of ethylene units is preferably not greater than 70 mole %. With consideration for a good balance between adhesion and hydrophilicity, it is especially preferable that the content of ethylene units be within the range of 25 to 50 mole %.

Saponification of the ethylene-vinyl acetate copolymer can be carried out according to any well-known procedure. For example, this can be accomplished by heating the ethylene-vinyl acetate copolymer in an aqueous solution of an alkali (such as sodium hydroxide) for a sufficient period of time. This saponification treatment converts the acetyl groups of the vinyl acetate portions to hydroxyl groups and thereby imparts good hydrophilicity to the copolymer. In order to impart a sufficient degree of hydrophilicity to a porous hollow fiber membrane, it is preferable to saponify the ethylene-vinyl acetate copolymer until a degree of saponification of not less than 60 mole % is attained.

In order to hold the saponification product directly on at least a part of the pore surfaces of a porous polypropylene hollow fiber membrane used as the matrix, there may be employed (1) a method which comprises introducing a holding solution containing the saponification product into at least the pores of the hollow fiber membrane matrix by soaking, coating or other technique and then evaporating the solvent of the solution; and (2) a method which comprises introducing a holding solution containing the saponification product into the pores of the hollow fiber membrane matrix by soaking, coating or other technique, dipping the hollow fiber membrane matrix in a solution of a coagulant for the saponification product to coagulate it quickly on at least the pore surfaces, and then drying the hollow fiber membrane matrix.

The holding solution can be prepared by dissolving the saponification product in a solvent therefor. As the solvent, there may be used a water-miscible organic solvent or a mixture of a water-miscible organic solvent and water. Useful water-miscible organic solvents include alcohols such as methanol, ethanol, n-propanol, isopropanol, sec-butanol, tert-butanol and cylohexanol; polyhydric alcohols such as ethylene glycol, propylene glycol and glycerol; and tetrahydrofuran, dioxane, dimethylformamide, dimethylsulfoxide, dimethylacetoamide, formamide, ethylene chlorohydrin, etc. These water-miscible organic solvents may be used alone or in admixture of two or more. Among them, ethanol and dimethylsulfoxide are especially preferred because of their good dissolving power for the saponification product and their low toxicity.

Most preferably, a mixture of a water-miscible organic solvent and water is used as the solvent for the following reason. The saponification product is composed of ethylene units that are nonpolar and hydrophobic, and vinyl acetate units that are polar and hydrophilic (including those in which the acetyl group has been converted to a hydroxyl group by saponification). As a result, it is believed that, when the saponification product is dissolved in a highly polar solvent system and the resulting solution is applied to a nonpolar polypropylene matrix, nonpolar ethylene units tend to be localized in that surface of the resulting thin layer of the saponification product which contacts the polypropylene matrix, and polar vinyl acetate units tend to be localized in the opposite surface (remote from the polypropylene matrix). This phenomenon is desirable because the adhesion of the thin layer to the polypropylene constituting the pore surfaces is improved and, moreover, the hydrophilicity of the surface of the thin layer held on the pore surfaces is also improved. Accordingly, it is preferable to use a mixture of water and an organic solvent as the solvent for the holding solution, because the polarity of the solvent is enhanced to promote the above-described phenomenon. The proportion of water used in the mixture is preferably maximized so long as the dissolution of the saponification product is not interfered with. Although the proportion of water may vary according to the concentration of the saponification product, the content of ethylene units therein, the treating temperature and other factores, the preferred range is, for example, from 5 to 60% by weight.

The concentration of the saponification product in the above-described holding solution should be sufficiently high to produce the desired hydrophilizing effect and is determined with consideration for the properties of the porous polypropylene hollow fiber membrane serving as the matrix. For example, the concentration should preferably within the range of 0.1 to 5.0% by weight. The soaking, coating or other treatment of the porous polypropylene hollow fiber membrane with the holding solution may be completed in a single operation, or carried out in several steps by using a holding solution having containing the saponification product at a relatively low concentration. If the concentration is greater than 5.0% by weight, the amount of saponification product deposited is so great that it tends to reduce the pore diameter of the porous polypropylene hollow fiber membrane serving as the matrix and detract from the liquid permeation performance thereof. Although no particular limitation is placed on the temperature of the holding solution, higher temperatures are generally preferred because they facilitate the dissolution of the saponification product and reduce the viscosity of the resulting solution. For example, it is preferable to employ a temperature ranging from room temperature to 100° C. In the case of soaking treatment, the soaking time may preferably range from several seconds to several tens of minutes. In order to remove the solvent from the holding solution held in the pores of the porous polypropylene hollow fiber membrane serving as the matrix, there may be employed such techniques as vacuum drying and hot air drying. The drying may be carried out at a temperature at which the matrix does not undergo thermal deformation, and it is preferable to employ a temperature of 130° C. or below.

Next, the method which comprises holding an ethylene-vinyl acetate copolymer on at least a part of the pore surfaces of a porous polypropylene hollow fiber membrane serving as the matrix and then saponifying it will be more specifically described with reference to one illustrative example.

The ethylene-vinyl acetate copolymer can be held on the matrix according to a method similar to the above-described method (1) or (2) for holding the saponification product directly on the matrix. The contents of ethylene units and vinyl acetate units in the ethylene-vinyl acetate copolymer is preferably within the respective ranges described previously. As the solvent for the preparation of a holding solution of the ethylene-vinyl acetate copolymer, there may be used any of the previously described solvents for the preparation of a holding solution of the saponification product, as well as halogenated hydrocarbons, aromatic hydrocarbons and the like. Among others, a mixture of water and an organic solvent is preferred for the same reason as described for the saponification product. The concentration of the ethylene-vinyl acetate copolymer in the holding solution should preferably be, for example, within the range of 1.0 to 5.0% by weight. The soaking, coating or other treatment for holding the ethylene-vinyl acetate copolymer may be completed in a single operation, or carried out in several steps by using a holding solution having a relatively low concentration. However, where this treatment is to be completed in a single operation, the use of a holding solution having a concentration of less than 1.0% by weight is undesirable because sufficient hydrophilicity cannot be obtained after the saponification treatment. If the concentration is greater than 5.0% by weight, the ethylene-vinyl acetate copolymer tends to reduce the pore diameter of the porous polypropylene hollow fiber membrane serving as the matrix and detract from the liquid permeation performance thereof.

After the ethylene-vinyl acetate copolymer is held on the hollow fiber membrane in the above-described manner, the hollow fiber membrane is subjected to a saponification treatment for the production of a hydrophilized porous hollow fiber membrane in accordance with the present invention. This saponification treatment can be carried out, for example, by heating the hollow fiber membrane having the ethylene-vinyl acetate copolymer held thereon in an aqueous solution of an alkali (such as sodium hydroxide) for a sufficient period of time.

When the saponification product is held on the pore surfaces of the porous polypropylene hollow fiber membrane serving as the matrix according to the above-described various methods, care should be taken that the saponification product is distributed over the pore surfaces of the hollow fiber membrane as evenly as possible. Moreover, the amount of saponification product held should preferably be minimized so that the hollow fiber membrane may not suffer from a substantial reduction in pore diameter or plugging.

Another type of hydrophilized porous polypropylene hollow fiber membranes in accordance with the present invention comprise the above-described porous polypropylene hollow fiber membranes of large pore diameter having a hydrophilic crosslinked polymer, which is formed by polymerizing monomers including diacetone acrylamide and a crosslinkable monomer, held on at least a part of the pore surfaces thereof.

In these hydrophilized porous polypropylene hollow fiber membranes, a hydrophilic crosslinked polymer composed of monomers including diacetone acrylamide and a crosslinkable monomer is held on the wall surfaces of the pores of a porous polypropylene hollow fiber membrane having a large pore diameter and a high porosity. This polymer has been selected with the following reasons. Compared with other polymers, (1) this polymer can adhere firmly to polypropylene; (2) it can be almost uniformly held over substantially the entire wall surfaces of the pores of a porous polypropylene hollow fiber membrane; (3) it has a suitable degree of hydrophilicity; and (4) it is substantially insoluble in water.

The term "hydrophilic crosslinked polymer formed by polymerizing monomers including diacetone acrylamide and a crosslinkable monomer" as used herein means a crosslinked polymer derived from a monomer mixture containing not less than 50% by weight of diacetone acrylamide as a monomer component and also containing a crosslinkable monomer. In addition to them, a non-crosslinkable monomer may be contained therein as a monomer component.

The crosslinkable monomer is a monomer which contains two or more polymerizable unsaturated bonds such as vinyl and allyl bonds that are copolymerizable with diacetone acrylamide, or a monomer which contains one polymerizable unsaturated bond as described above and at least one functional group capable of forming a chemical bond, for example, by a condensation reaction. And, as such monomers, ones have a good solvent in common with diacetone acrylamide. Examples of such monomers include N,N'-methylenebisacrylamide, N-hydroxymethyl(meth)acrylamide, triallyl cyanurate, triallyl isocyanurate, divinylbenzene, 2,2-bis(4-methacryloyloxypolyethoxyphenyl)propane, ethylene di(meth)acrylate, polyethyleneglycol di(meth)acrylate, trimethylolpropane tri(meth)acrylate, pentaerythritol tetra(meth)acrylate, trimethylolethane tri(meth)acrylate, butanediol di(meth)acrylate, hexanediol di(meth)acrylate, diallyl phthalate and 1,3,5-triacryloyl-hexaneoxy-s-triazine.

The non-crosslinkable monomer is a monomer which contains one polymerizable unsaturated bond such as vinyl or allyl bond that is copolymerizable with diacetone acrylamide, and has a good solvent in common with diacetone acrylamide. Examples of such a monomer include dimethylacrylamide, vinylpyrrolidone, acrylic acid, methacrylic acid, hydroxyethyl methacrylate, styrenesulfonic acid, sodium styrenesulfonate, sodium sulfoethylmethacrylate, vinylpyridine and vinyl methyl ether.

These crosslinkable and non-crosslinkable monomers which are used in combiantion with diacetone acrylamide will hereinafter be referred to collectively as "copolymerizable monomers".

As regards the proportions of diacetone acrylamide and the crosslinkable monomer which in combination form the hydrophilic crosslinked polymer, the crosslinkable monomer is preferably used in an amount of 0.3 to 100 parts by weight, more preferably 0.5 to 80 parts by weight, per 100 parts by weight of diacetone acrylamide. As regards the proportion of the copolymerizable monomers, they are preferably used in an amount of 0.3 to 110 parts by weight, more preferably 0.5 to 100 parts by weight, per 100 parts by weight of diacetone acrylamide.

In the present invention, the polymer held on at least a part of the wall surfaces of the pores of porous polypropylene hollow fiber membrane having a large pore diameter and a high porosity is a crosslinked polymer. This polymer has the advantage that it undergoes only a slight degree of swelling in water and involves no risk of plugging the pores. Moreover, this polymer has the additional advantage that it has good stability and its components scarcely dissolve out in water. Accordingly, the hydrophilized porous hollow fiber membrane of the present invention are useful in the fields of water treatment and blood treatment in which even a slight amount of dissolved components may become a problem. In contrast, a diacetone acrylamide polymer having no crosslinked structure swells in water and plugs the pores. It also dissolves in water to produce dissolved components, albeit in small amounts. Thus, porous hollow fiber membranes having such a polymer held thereon have the risk of presenting various problems during use.

The higher the degree of hydrophilicity of the polymer, the better the water permeation performance of the resulting hydrophilized porous hollow fiber membrane. Accordingly, a water-soluble crosslinkable monomer having a sufficient degree of hdyrophilicity is preferably used as the crosslinkable monomer for forming the hydrophilic crosslinked polymer, because the resulting hydrophilized porous hollow fiber membrane allows water to permeate evenly through the entire membrane area in a short time after starting their use.

Such a water-soluble crosslinkable monomer is a crosslinkable monomer having a water solubility of 1.0 g/dl or greater in water at 30° C. Examples thereof include N-hydroxymethylacrylamide, N-hydroxymethylmethacrylamide and N,N'-methylenebisacrylamide.

The amount of hydrophilic crosslinked polymer held on at least a part of the wall surfaces of the pores of porous polypropylene hollow fiber membrane having a large pore diameter and a high porosity in accordance with the present invention is preferably within the range of about 0.5 to 100% by weight based on the weight of the porous polypropylene hollow fiber membrane, though it depends on the porosity and pore diameter of the porous polypropylene hollow fiber membrane. If the amount of polymer held is less than the above-described range, it is impossible to impart sufficient hydrophilicity to the porous hollow fiber membrane. On the other hand, even if the amount of polymer held is greater than the above-described range, the hydrophilicity of the porous hollow fiber membrane show no further improvement. On the contrary, the volume of the pores may be decreased to cause a reduction in water permeation performance. The amount of polymer held is more preferably within the range of about 0.5 to 50% by weight and most preferably within the range of about 1 to 30% by weight.

A variety of methods may be employed to hold the hydrophilic crosslinked polymer on at least a part of wall surfaces of the pores of the porous polypropylene hollow fiber membranes. By way of example, a solution is prepared by dissolving diacetone acrylamide and the above-described copolymerizable monomers (hereinafter referred to collectively as "monomers") and a polymerization initiator in a suitable solvent such as an organic solvent or water. Then, a starting hollow fiber membrane is impregnated with the solution of the monomers by soak ing the starting hollow fiber membrane in the solution, or by fabricating a membrane module with the starting hollow fiber membrane and then causing the solution to penetrate under pressure into the starting hollow fiber membrane. Thereafter, the solvent is removed by evaporation. By using a solution prepared by diluting the monomers with a solvent, the monomers can be almost uniformly deposited over the entire surfaces of the porous hollow fiber membrane without plugging the pores of the porous hollow fiber membrane. The amount of monomers deposited can be controlled by varying the concentrations of the monomers in the solution and the time spend for impregnation with the solution.

After the monomers are held on at least a part of the wall surfaces forming the pores of the starting hollow fiber membrane in the above-described manner, the solvent is removed and the monomers are then polymerized. Thus, there is obtained a hydrophilic crosslinked polymer held on at least a part of the wall surfaces of the pores of the porous polypropylene hollow fiber membrane.

The solvent used for the preparation of the above-described solution can be water or an organic solvent which has a boiling point lower than those of the monomers and can dissolve the monomers. Where a polymerization initiator is added, it is preferable to use a solvent which can also dissolve the polymerization initiator. Such organic solvents include, for example, alcohols such as methanol, ethanol, propanol and isopropanol; ketones such as acetone, methyl ethyl ketone and methyl isobutyl ketone; ethers such as tetrahydrofuran and dioxane; and ethyl acetate. Although no particular limitation is placed on the boiling point of the organic solvent, it is preferably 100° C. or below and more preferably 80° C. or below because such a boiling point facilitates the removal of the solvent prior to the polymerization step.

Since the surface of a porous polypropylene hollow fiber membrane is hydrophobic, the penetration of an aqueous solution containing the monomers into the pores tends to cause the monomers to be adsorbed on the pore surfaces with their hydrophilic groups oriented outward, especially where water is used as the solvent. Thus, if the monomers are fixed in this state by polymerization, it is possible to impart hydrophilicity to the porous hollow fiber membrane very efficiently. Where water is used as the solvent, the porous hollow fiber membrane may be directly brought into contact with the solution. Alternatively, they may also be brought into contact with the solution after the wall surfaces of the pores thereof have been subjected to a wetting treatment with an alcohol or ketone in advance.

In contrast, the use of an organic solvent as the solvent has the advantage that the solution can penetrate into the pores of the starting hollow fiber membrane in a short period of time and the solvent can be easily removed from the pores.

Even if the monomers are polymerized on the pores surfaces in a randomly oriented state without making use of the above-described oriented adsorption, the resulting hydrophilic crosslinked polymer has a higher degree of hydrophilicity than polypropylene. Accordingly, the pore surfaces having the polymer held thereon is relatively hydrophilic, as compared with the pore surfaces having no polymer held thereon. Thus, there can be obtained a porous polypropylene hollow fiber membrane having hydrophilicity imparted thereto.

The need for a polymerization initiator depends on the polymerization technique employed. A polymerization initiator is used in thermal polymerization and photopolymerization, but no polymerization initiator is needed for radiation polymerization.

In the case of thermal polymerization, there may be used various peroxides, azo compounds and redox initiators which are known as radical polymerization initiators. Examples thereof include azo compounds such as 2,2'-azobisisobutyronitrile, 2,2'-azobiscyclopropylpropionitrile 2,2'-azobis-2,4-dimethylvaleronitril and 2,2'-azobis-2,3,3-trimethylbutyronitrile; peroxides such as acetyl peroxide, propionyl peroxide, butyryl peroxide, isobutyryl peroxide, succinyl peroxide, benzoyl peroxide, benzoylisobutyryl peroxide, β-allyloxypropionyl peroxide, hexanoyl peroxide, 3-bromobenzoyl peroxide and bis(4-tert-butylcyclohexyl) peroxydicarbonate; and persulfates such as potassium persulfate and ammonium persulfate.

Especially where water is used as the solvent, water-soluble polymerization initiators such as azobisisobutyramidine and 4,4'-azobis-4-cyanopentanoic acid are preferred. However, the above-described water-insoluble polymerization initiator may also be used because they can be dispersed in water owing to the surface activity of the monomers themselves.

In the case of photopolymerization, there can be used polymerization initiators such as benzophenone, benzoin methyl ether, benzyl dimethyl ketal, fluororenone, 4-bromobenzophenone, 4-chlorobenzophenone, methyl O-benzoylbenzoate, benzoyl peroxide, anthraquinone, biacetyl and uranyl nitrate. These polymerization initiators may be suitably used in combination.

The proportions of the monomers and the solvent in the solution may be suitably determined with consideration for the type of the solvent, the desired amount of polymer held, and other factors. The solvent is preferably used in an amount of 50 to 10,000 parts by weight, more preferably 200 to 5,000 parts by weight, per 100 parts by weight of the monomers.

The polymerization initiator is preferably used in an amount of 0.001 to 100 parts by weight, more preferably 0.01 to 30 parts by weight, and most preferably 0.1 to 20 parts by weight, per 100 parts by weight of the monomers.

If the amount of solvent used is greater than the above-described range relative to the monomers, the amount of monomers held on the wall surfaces of the pores of the porous hollow fiber membrane is so small that a sufficient amount of polymer cannot be held thereon. If the amount of solvent used is less than the above-described range, it is difficult to control the amount of polymer held. Moreover, the amount of polymer held on the wall surfaces of the pores and within the pores is so large that the pores may be plugged.

When the starting hollow fiber membrane is subjected to a soaking or penetration treatment by using the above-described solution, the soaking or penetration time may range from about 0.5 second to about 30 minutes. This treatment can be completed in a shorter period of time as the wetting properties of the solution for the starting hollow fiber membrane becomes better.

After the monomers and, optionally, the polymerization initiator are held on at least a part of the wall surfaces of the pores of the porous polypropylene hollow fiber membrane in the above-described manner, the excess of solution was removed and, if desired, the solvent present within the pores is removed by evaporation. Then, the hollow fiber membrane is transferred to a polymerization step.

If the temperature used for evaporation of the solvent is excessively high, the polymerization proceeds partially while the solvent still remains. Thus, the polymerization takes place in the interior of the pores of the porous hollow fiber membrane and not on the wall surfaces of the pores, so that the pores may be plugged. With consideration for this problem, it is preferable to remove the solvent at a temperature of 10° to 40° C.

In producing the hydrophilized porous hollow fiber membrane of the present invention, there may employed various polymerization techniques such as thermal polymerization, photopolymerization, radiation polymerization and plasma polymerization.

In thermal polymerization, the polymerization temperature should be equal to or higher than the decomposition temperature of the above-described polymerization initiator. Moreover, it is desirable that the polymerization temperature is neither so high as to change the membrane structure of the porous polypropylene hollow fiber membrane nor so high as to damage the membrane matrix. Usually, a polymerization temperature of 30° to 100° C. can be used. Although the heating time depends on the type of the polymerization initiator and the heating temperature, it generally ranges from 1 minute to 5 hours and preferably from 15 minute to 3 hours in a batch process. In a continuous process, the polymerization can be carried out in a shorter period of time because heat transfer efficiency is higher. Accordingly, the heating time generally ranges from 10 seconds to 60 minutes and preferably from 20 seconds to 10 minutes.

In photopolymerization, ultraviolet or visible light can be used as the light for irradiation. As the source of ultraviolet light, there may be used a low-pressure mercury vapor lamp, high-pressure mercury vapor lamp, xenon lamp, arc lamp or the like.

For example, where a mercury vapor lamp is used as the light source, the following light irradiation conditions may be employed. While the lamp is operated at an input of 10 to 300 W/cm, the porous hollow fiber membrane is placed at a distance of 10 to 50 cm from the lamp and irradiated therewith for a period of 0.5 to 300 seconds. Thus, they are exposed to an energy of 0.001 to 10 joules/cm$^2$ and preferably 0.05 to 1 joule/cm$^2$.

An unduly low irradiation intensity makes it difficult to achieve a sufficient degree of hydrophilization. On the other hand, an unduly high irradiation intensity causes considerable damage to the porous polypropylene hollow fiber membrane. Accordingly, it is desirable to choose suitable light irradiation conditions carefully with consideration for the membrane thickness and other factors.

In radiation polymerization, the polymerization can be carried out, for example, by using an electron-ray irradiation apparatus to irradiate the porous hollow fiber membrane with electron rays to a dose of 10 to 50 Mrads at a temperature of 120° C. or below and preferably 100° C. or below.

If oxygen is present in the atmosphere during polymerization, the polymerization reaction is significantly inhibited. Accordingly, it is desirable to carry out the polymerization in a substantially oxygen-free state, for example, in an atmosphere of an inert gas such as nitrogen or in vacuo.

In forming the hydrophilic crosslinked polymer, the crosslinking reaction may be effected concurrently with the polymerization reaction. Alternatively, it may be effected subsequent to the formation of a copolymer. The crosslinking reaction, when it depends on condensation, may be effected by utilizing the heat of polymerization reaction or by additionally heating the polymerization system.

Where a condensation-dependent crosslinking reaction is used, the crosslinking reaction may be effected by dissolving a previously prepared uncrosslinked copolymer of diacetone acrylamide and a crosslinkable monomer in a solvent, holding a mixture of the copolymer and the monomer on the wall surfaces of the pores of the porous polypropylene hollow fiber membrane, and then subjecting the copolymer to a crosslinking reaction in that state. In this case, the uncrosslinked copolymer preferably has a molecular weight of 10,000 to 500,000. If its molecular weight is too high, it is difficult to make the copolymer penetrate into the pores of the porous polypropylene hollow fiber membrane. Therefore, use of such a high molecular weight is undesirable. More preferably, the molecular weight is within the range of 50,000 to 300,000.

In producing the hydrophilized porous hollow fiber membrane of the present invention, various polymerization techniques can be employed as described above. However, it is most preferable to effect the polymerization by means of thermal energy. The reason of this is that since the use of thermal energy permits even the pore portions of the porous hollow fibers to be heated evenly, the monomers can be uniformly polymerized on the entire pore surfaces on which they are held. Thermal polymerization also has the additional advantage that, if the polymerization temperature is properly determined, the polymerization can be effected without modification of the membrane structure or deterioration of the membrane matrix. In contrast, the use of light energy has the disadvantage that light cannot fully reach the inner part of the pores of the porous hollow fiber membrane due to scattering of the light and that the deterioration of the membrane matrix is accelerated at higher irradiation intensities of the light. Moreover, the use of radiation energy also has the disadvantage that the membrane matrix is liable to accelerated deterioration. Accordingly, where these polymerization techniques are employed, it is necessary to carefully choose polymerization conditions which do not deteriorate the membrane matrix.

Since the monomers or uncrosslinked copolymer held on the wall surfaces of the pores of the starting hollow fibers are polymerized/crosslinked or crosslinked in situ according to any of the above-described polymerization techniques, at least a part of the wall surfaces of the pores of the pores hollow fiber membrane are covered with the resulting polymer.

After the hydrophilic crosslinked polymer is formed, it is desirable to remove unnecessary materials (such as unreacted monomers and free polymer) remaining around the wall surfaces of the pores of the porous hollow fiber membrane by a soaking or penetration treatment with a suitable solvent. As the solvent, water, an organic solvent or a mixture thereof may be used alone or in combination.

The hydrophilized porous hollow fiber membrane of the present invention can be produced in the above-described manner. A particularly preferred process comprises holding monomers (including diacetone acrylamide and a water-soluble crosslinkable monomer) and a polymerization initiator on at least a part of the wall surfaces of the pores of a porous polypropylene hollow fiber membrane, and then polymerizing the monomers by the application of heat.

If a water-soluble copolymerizable monomer is used as a copolymerizable monomer, the swelling of the resulting polymer in water is suppressed, so that the amount of dissolving-out components can be decreased further and, at the same time, the detereoration of hydrophilicity of the resulting hydrophilized porous hollow fiber membrane due to the usage of copolymerizable monomer is prevented, so that the resulting hydrophilized porous hollow fiber membrane can exhibit excellent water permeation performance.

Moreover, hydrophilized porous hollow fiber membrane produced by thermal polymerization have the advantage that the polymer is held uniformly in the direction of the thickness of the membrane and the membrane matrix is substantially free of damage.

The individual steps have been separately described above. However, it is to be understood that, in producing the hydrophilized porous hollow fiber membranes of the present invention, various steps such as holding of the monomers on the wall surfaces of the pores of a porous polypropylene hollow fiber membrane, removal of the solvent, polymerization, and washing after polymerization can be carried out in a substantially continuous manner.

The present invention will be more specifically explained with reference to the following examples. In these examples, measurements were made according to the methods described below.

1. Evaluation of Hollow Fibers (1) Air Permeability:

Fifty porous hollow fibers were bundled in a U-shape and their open end portions were fastened with a urethane resin to fabricate a module. The length of the portions embedded in the resin was 2.5 cm and the effective length of the hollow fibers was 5 cm. An air pressure of 0.5 atmosphere was applied to the inside of the hollow fibers of the module at a temperature of 25° C., and the amount of air that escaped through the walls of the hollow fibers was determined. The membrane area was calculated on the basis of the inner diameter of the hollow fibers.

(2) Elastic Recovery Factor:

Using a Model UTM-II Tensilon manufactured by Toyo Bowldwin Co., measurements were made at a fiber length of 2 cm and a testing rate of 1 cm per minute. then, the elastic recovery factor was determined according to the following equation.

$$\text{Elastic recovery factor} = \frac{\text{Fiber length when stretched by 50\%} - \text{Fiber length when the load was returned to zerp after stretching by 50\%}}{\text{Fiber length when stretched by 50\%} - \text{Fiber length before stretching}} \times 100(\%)$$

(3) Average Length of Microfibrils:

The average length of microfibrils was determined from an electron photomicrograph.

2. Evaluation of Hydrophilized Porous Hollow Fibers

"Water permiation pressure", "water permeability after hydrophilized by using alcohol" and "water permeability after holding a polymer" were measured accoridng to the following methods, using test membrane modules each having an effective membrane area of 163 cm$^2$. The solubilities in water at 30° C. of N-hydroxymethylacrylamide, N,N'-methylene bisacrylamide and triallyl isocyanurate, which were used in the following examples, were 197 g/dl, 3 g/dl and 0.1 g/dl, respectively.

(1) Water Permiation Pressure:

Water at 25° C. was fed from one side (the inside of hollow fibers in the case of a hollow fiber membrane) of a test membrane module while the water pressure was raised at a rate of 0.1 kg/cm$^2$ per minute. Thus, water pressures were separately measured when the cumulative amount of penetrated water reached 30 ml and 50 ml. These data were plotted with the water pressures as abscissa and the amount of penetrated water as ordinate, and a straight line connecting these two points was drawn. The pressure at which this straight line intersected the abscissa axis was determined and regarded as the water penetration pressure.

(2) Water Permeability After Hydrophilized by using Alcohol:

From one side (the inside of hollow fibers in the case of a hollow fiber membrane) of a test membrane module which had not been subjected to any hydrophilizing treatment, ethanol was fed under pressure at a flow rate of 25 ml/min for 15 minutes to wet the porous membrane fully with ethanol to the interior of its pores. Thereafter, water was made to flow at a flow rate of 100 ml/min for 15 minutes, so that the ethanol present in the pores was replaced by water. Then, water at 25° C. was made to flow on one side (the inside of hollow fibers in the case of a hollow fiber membrane) of the test membrane module and the amount of permeated water was measured at a transmembrane pressure difference of 50 mmHg. The water permeability (in l/m$^2$.hr.mmHg) was determined from the measured amount of permeated water in terms of unit time.

(3) Amount of Polymer Held:

The nitrogen content was determined by elemental analysis. On the assumption that the nitrogen was derived solely from the polymer and the composition of the polymer was the same as the monomer composition, the amount of hydrophilic crosslinked polymer held per unit weight of the porous polypropylene hollow fiber membrane was determined in terms of weight percentage.

(4) Evaluation of the State of Coverage of Pore Surfaces:

A porous hollow fiber was soaked for 1 minute in a standard solution (blue) for wetting tests as described in JIS K6768(1971), which solution has a surface tension of 54 dyne/cm. After the hollow fiber was air-dried, a cross-section thereof was observed under an optical microscope to examine the state of distribution of the colored polymer.

(5) Cumulative Dissolution:

A porous hollow fiber was soaked in warm water at 65° C., whose amount was equal to 10 times the weight of the hollow fiber. Then, the total organic carbon content of the warm water was measured at regular intervals. On the assumption that this total organic carbon content was derived solely from the hydrophilic crosslinked polymer having the composition assumed in the above test (3), the cumulative dissolution (in wt. %) was determined relative to the amount of polymer held before the dissolving-out treatment.

(6) Water Permeability After Holding a Polymer:

From one side of (the inside of hollow fibers in the case of a hollow fiber membrane) of a test membrane module fabricated with a porous hollow fiber membrane having a polymer held thereon, water was fed under a pressure of 2 kg/cm$^2$ for 3 hours. Then, water at 25° C. was made to flow on the one side of the test membrane module, and the amount of permeated water was measured at a transmembrane pressure difference of 50 mmHg. The water permeability (in l/m$^2$.hr.mmHg) was determined from the measured amount of permeated water in terms of unit time.

EXAMPLE 1

Using a hollow fiber-forming spinneret having an extruding port diameter of 17.5 mm, an annular slit width of 1.5 mm, and a cross-sectional area of extruding port of 0.75 cm$^2$, a polypropylene (UBE POLYPRO YK121; a product of Ube Industries, Ltd.) having a melt index of 3 was spun at a spinning temperature of 200° C. and an extrusion line speed of 9.24 cm/min. The spun hollow fiber was taken up at a take-up speed of 40 m/min and a spinning draft of 433. The resulting unstretched hollow fiber had an inner diameter of 545 μm and a wall thickness of 72 μm.

This unstretched hollow fiber was heat-treated with holding it not to change its length at 150° C. for 24 hours. The elastic recovery factor of this unstretched hollow fiber was 92.5%. Subsequently, the heat-treated hollow fiber was stretched by 40% at room temperature with a deformation rate of 200% per second, and then stretched by rollers in a box heated at 155° C. with a deformation rate of 2.8% per second until a total amount of stretching of 1,100% (i.e., a total stretching ratio of 12) was attained, thereby producing a porous hollow fiber membrane continuously.

The resulting porous polypropylene hollow fiber membrane had been stretched 12-fold relative to the unstretched hollow fiber, and it had an inner diameter of 430 μm, a wall thickness of 57 μm, and a porosity of 81%. Its average pore diameter was 1.8 μm as measured with a mercury porosimeter, and its air permeability was 190×10$^4$ l/m$^2$.hr.0.5 atm. Observation with a scanning electron microscope revealed that there were a countless number of characteristic rectangular pores and the average length of microfibrils was 4.1 μm.

EXAMPLE 2

Using a hollow fiber-forming spinneret of double-tubular construction having an extruding port diameter of 17.5 mm, an annular slit width of 1.5 mm, and a cross-sectional area of extruding port of 0 75 cm$^2$, a polypropylene (UBE POLYPRO B101H; a product of Ube Industries, Ltd.) having a melt index of 0.8 was spun at a spinning temperature of 220° C. and an extrusion line speed of 9.24 cm/min. The spun hollow fiber was taken up at a take-up speed of 20 m/min and a spinning draft of 216. The resulting unstretched hollow fiber had an inner diameter of 610 μm and a wall thickness of 83 μm.

This unstretched hollow fiber was heat-treated with holding it not to change its length at 150° C. for 24 hours. The elastic recovery factor of this unstretched hollow fiber was 91%. Subsequently, the heat-treated hollow fiber was stretched by 35% at 40° C. with a deformation rate of 200% per second, then stretched by rollers in a box heated at 155° C. with a deformation rate of 0.5% per second until a total amount of stretching of 1,900% was attained, and further thermally set in a box heated at 155° C. for 60 seconds, thereby producing a porous hollow fiber membrane continuously.

The resulting porous polypropylene hollow fiber membrane had been stretched 20-fold relative to the unstretched hollow fiber, and it had an inner diameter of 540 μm, a wall thickness of 73 μm, and a porosity of 88%. Its average pore diameter was 3.5 μm as measured with a mercury porosimeter, and its air permeability was 380×10$^4$ l/m$^2$.hr.0.5 atm. Observation with a scanning electron microscope revealed that there were a countless number of characteristic rectangular pores and the average length of microfibrils was 7.5 μm.

COMPARATIVE EXAMPLE 1

A hollow fiber was spun under the same conditions as employed in Example 1, except that a polypropylene (UBE POLYPRO YK121; a product of Ube Industries, Ltd.) having a melt index of 3 was used. The resulting unstretched hollow fiber had an inner diameter of 553 μm and a wall thickness of 76 μm.

This unstretched hollow fiber was heat-treated and stretched under the same conditions as employed in Example 2, except that the total amount of stretching was 550%. Thus, a porous hollow fiber membrne was produced continuously. However, its average pore diameter was 0.3 μm as measured with a mercury porosimeter, and never exceeded 1.0 μm.

COMPARATIVE EXAMPLE 2

A hollow fiber was spun under the same conditions as employed in Example 1, except that a polypropylene (UBE POLYPRO J115G; a product of Ube Industries, Ltd.) having a melt index of 15 was used. The resulting unstretched hollow fiber had an inner diameter of 580 μm and a wall thickness of 78 μm.

This unstretched hollow fiber was heat-treated and stretched under the same conditions as employed in Example 1, except that the total amount of stretching was 600%. The resulting hollow fiber was frequently broken during hot stretching and could not be stretched uniformly.

EXAMPLE 3

Using a hollow fiber-forming spinneret having an extruding port diameter of 17.5 mm, an annular slit width of 1.5 mm, and a cross-sectional area of extruding port of 0.75 cm$^2$, a polypropylene (UBE POLYPRO YK121; a product of Ube Industries, Ltd.) having a melt index of 3 was spun at a spinning temperature of 200° C. and an extrusion line speed of 9.24 cm/min. The spun hollow fiber was taken up at a take-up speed of 45 m/min and a spinning draft of 489. The resulting unstretched hollow fiber had an inner diameter of 540 μm and a wall thickness of 72 μm.

This unstretched hollow fiber was heat-treated with holding it not to change its length at 150° C. for 24 hours. The elastic recovery factor of this unstretched hollow fiber was 92.5%. Subsequently, the heat-treated hollow fiber was stretched by 40% at room temperature with a deformation rate of 200% per second, and then stretched by rollers in a box heated at 155° C. with a deformation rate of 2.8% per second until a total amount of stretching of 1,100% (i.e., a total stretching ratio of 12) was attained, thereby producing a porous hollow fiber membrane continuously.

The resulting porous polypropylene hollow fiber membrane had been stretched 12-fold relative to the unstretched hollow fiber, and it had an inner diameter of 430 μm, a wall thickness of 59 μm, and a porosity of 80%. Its average pore diameter was 1.7 μm as measured with a mercury porosimeter, and its air permeability was 105×10$^4$ l/m$^2$.hr.0.5 atm. Analysis of its cross section with a scanning electron microscope revealed that there were a countless number of characteristic rectangular pores which were contiguous with each other from the inner wall surface to the outer wall surface of the hollow fiber membrane to form a stacked, multicellular structure, and the average length of microfibrils was 3.7 μm.

On the other hand, an ethylene-vinyl alcohol copolymer (Soanol E; a saponification product of an ethylene-vinyl acetate copolymer: a product of Nippon Synthetic Chemical Industries Co,) having an ethylene content of 33 mole % was added to a 75 vol. % aqueous solution of ethanol and dissolved therein by the application of heat to prepare a 1 wt. % solution thereof. While the temperature of this solution was maintained at 50° C., the above-described porous polypropylene hollow fiber membrane was placed in the solution and allowed to stand for 5 minutes. Thereafter, the hollow fiber membrane was taken out of the solution, deprived of the excess solution, and then dried in a hot-air oven at 50° C. for 2 hours.

The resulting hydrophilized porous hollow fiber membrane had a large pore diameter and a high porosity, and exhibited good hydrophilicity owing to the saponification product of ethylene-vinyl acetate copolymer held thereon. When this porous hollow fiber membrane was soaked in water, it was easily wetted with water and exhibited good water permeability without requiring any particular treatment. Fifty segments of this porous hollow fiber membrane were bundled in a U-shape and placed in a housing, and their ends were fixed to the housing with a resin so as to leave them open. The region in contact with the outer wall surfaces of the porous hollow fiber membrane was divided in a liquid-tight manner from the region to which their ends were open. When measurements were made using the module so fabricated, the hollow fiber membrane was found to have a water permeability of 36 $l/m^2.hr.mmHg$ and exhibit excellent water permeation performance. Furthermore, the hollow fiber was alternately dried and wetted ten times, but neither reduction in water permeability nor change in mechanical strength was observed.

EXAMPLE 4

A solution was prepared by dissolving 3 parts by weight of an ethylene-vinyl acetate copolymer (in a ratio of 55:45) in 97 parts by weight of toluene. While this solution was kept at 25° C., a porous polypropylene hollow fiber membrane obtained in the same manner as described in Example 1 was soaked therein for 30 seconds. Thereafter, the hollow fiber membrane was dried in vacuo at 50° C. for 3 hours to remove the solvent.

Then, the hollow fiber membrane was placed in an aqueous alkaline solution prepared by dissolving 10 g of sodium hydroxide in 1 liter of water, and subjected to a saponification treatment at 70° C. for 1 hour. Thereafter, the hollow fiber membrane was washed with water and dried to obtain a hydrophilized porous polypropylene hollow fiber membrane.

A module was fabricated from fifty segments of this hollow fiber membrane in the same manner as described in Example 3. When measurements were made using this module, the hollow fiber membrane was found to have a water permeability of 32 $l/m^2.hr.mmHg$ and exhibit excellent water permeation performance. Furthermore, similarly to example 3, the hollow fiber membrane was alternately dried and wetted ten times, but neither reduction in water permeability nor change in mechanical strength was observed.

EXAMPLE 5

Using a hollow fiber-forming spinneret having an extruding port diameter of 17.5 mm, an annular slit width of 1.5 mm, and a cross-sectional area of extruding port of 0.75 $cm^2$, a polypropylene (UBE POLYPRO YK121; a product of Ube Industries, Ltd.) having a melt index of 3 was spun at a spinning temperature of 215° C. and an extrusion line speed of 9.24 cm/min. The spun hollow fiber was taken up at a take-up speed of 50 m/min and a spinning draft of 543. The resulting unstretched hollow fiber had an inner diameter of 360 μm and a wall thickness of 65 μm.

This unstretched hollow fiber was heat-treated with holding it not to change its length at 150° C. for 24 hours. The elastic recovery factor of this unstretched hollow fiber was 92.5%. Subsequently, the heat-treated hollow fiber was stretched by 40% at room temperature with a deformation rate of 200% per second, and then stretched by rollers in a box heated at 155° C. with a deformation rate of 2.8% per second until a total amount of stretching of 1,000% (i.e., a total stretching ratio of 11) was attained, thereby producing a porous hollow fiber membrane continuously.

The resulting porous polypropylene hollow fiber membrane had been stretched 11-fold relative to the unstretched hollow fiber, and it had an inner diameter of 300 μm, a wall thickness of 57 μm, and a porosity of 82%. Its average pore diameter was 1.7 μm as measured with a mercury porosimeter, and its air permeability was 95×10$^4$ $l/m^2.hr.0.5$ atm. Observation with a scanning electron microscope revealed that there were a countless number of characteristic rectangular pores and the average length of microfibrils was 3.7 μm. Its water permeability after hydrophilized by using alcohol was 39 $l/m^2.hr.mmHg$.

The resulting porous polypropylene hollow fiber membrane having a large pore diameter and a high porosity was soaked for 12 seconds in a treating solution composed of 100 parts of diacetone acrylamide, 5 parts of N-hydroxymethylacrylamide, 1 part of benzoyl peroxide, and 1,000 parts of acetone. The hollow fiber membrane was taken out of the treating solution and dried in flowing nitrogen for 5 minutes. Subsequently, the hollow fiber membrane was heat-treated at 65° C. for 60 minutes in an atmosphere of nitrogen and then soaked in a 50:50 solvent mixture of water and ethanol for 10 minutes. Thereafter, the hollow fiber membrane was ultrasonically cleaned in warm water for 2 minutes to wash off unnecessary materials, and then dried in hot air to remove the solvent. Thus, there was obtained a porous polypropylene hollow fiber membrane having a polymer held thereon. The water permiation pressure, water permeability, amount of polymer held, and cumulative dissolution of the polymer held on the porous hollow fiber membrane were measured, and the results thus obtained are shown in Table 1.

The water permeation performance of the resulting hydrophilized porous polypropylene hollow fiber membrane was excellent. Observation with a scanning electron microscope revealed that the polymer was almost uniformly held over substantially the entire wall surfaces of the pores of the porous polypropylene hollow fiber membrane. Moreover, the measurements of cumulative dissolution revealed that essentially no component dissolved out after 24 hours.

EXAMPLES 6–8

A series of polymers were separately held on porous polypropylene hollow fiber membranes under the same conditions as employed in Example 5, except that N-hydroxymethylacrylamide was used as the crosslinkable monomer in the respective amounts shown in Table 1.

The performance of the resulting hydrophilized porous polypropylene hollow fiber membranes was evaluated, and the results thus obtained are shown in Table 1.

EXAMPLE 9

Using a porous polypropylene hollow fiber membrane obtained in the same manner as described in Example 1, a polymer was held thereon under the same conditions as employed in Example 5, except that a treating solution composed of 100 parts of diacetone acrylamide, 5 parts of N,N'-methylenebisacrylamide, 5 parts of 2,2'-azobisisobutyronitrile, and 800 parts of acetone was used, and the hollow fiber membrane was heat-treated at 65° C. for 60 minutes. The performance of the resulting hydrophilized porous polypropylene hollow fiber membrane was evaluated, and the results thus obtained are shown in Table 1.

When the state of coverage with the hydrophilic crosslinked polymer was observed, it was found that polymer was almost uniformly held over substantially the entire wall surfaces of the pores. Moreover, the measurements of cumulative dissolution revealed that essentially no component dissolved out after 24 hours.

EXAMPLE 10

A polymer was held on a porous polypropylene hollow fiber membrane under the same conditions as employed in Example 5, except that a solution composed of 100 parts of diacetone acrylamide, 1 part of divinylbenzene, 0.3 part of benzoyl peroxide, and 450 parts of methyl ethyl ketone was used, the hollow fiber membrane was soaked therein for 3 seconds, and the thermal polyemrization was carried out at 70° C. for 60 minutes.

The performance of the resulting hydrophilized porous polypropylene hollow fiber membrane was evaluated, and the results thus obtained are shown in Table 1. When the state of coverage with the hydrophilic crosslinked polymer was observed, it was found that polymer was almost uniformly held over substantially the entire wall surfaces forming the pores. Moreover, the measurements of cumulative dissolution revealed that essentially no component dissolved out after 24 hours.

components dissolving out of it is very small. Accordingly, the hydrophilized porous polypropylene hollow fiber membranes of the present invention can also be used in various field of water treatment including hot water treatment, and hence have very high practical value.

We claim:

1. A porous polypropylene hollow fiber membrane of large pore diameter which consists of polypropylene, the hollow fiber membrane having:
   (a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;
   (b) an average pore diameter ranging from 1.7 μm up to 10 μm as measured with a mercury porosimeter:
   (c) a porosity of 80 to 95%; and
   (d) an air permeability of not less than $4\times10^5$ l/m².hr.0.5 atm.

2. A porous polypropylene hollow fiber membrane as claimed in claim 1 wherein the microfibrils have an average length ranging from greater than 1 μm up to 15 μm.

3. A porous polypropylene hollow fiber membrane as claimed in claim 1 wherein the polypropylene is isotactic polypropylene or syndioctactic polypropylene.

4. A porous polypropylene hollow fiber membrane as claimed 1 wherein the polypropylene has a melt index of 0.1 to 10.

5. A hydrophilized porous polypropylene hollow fiber membrane comprising a porous polypropylene hollow fiber membrane of large pore diameter having a saponification

TABLE 1

| Example No. | Crosslinkable monomer Type | Amount used (parts by weight) | Amount of polymer held (wt. %) | Performance of hydrophilized porous hollow fiber membrane | | | | | |
|---|---|---|---|---|---|---|---|---|---|
| | | | | Water penetration pressure (kg/cm²) | Water permeability (l/m² · hr · mmHg) | Dissolution (wt. %) | | | |
| | | | | | | 1 hr | 24 hr | 200 hr | 800 hr |
| Example 5 | A | 5 | 28.5 | 0.1 | 42 | 0.030 | 0.035 | 0.035 | 0.035 |
| Example 6 | A | 15 | 29.7 | 0.1 | 41 | 0.027 | 0.032 | 0.032 | 0.032 |
| Example 7 | A | 80 | 30.5 | 0.1 | 40 | 0.024 | 0.026 | 0.027 | 0.027 |
| Example 8 | A | 0.5 | 25.8 | 0.1 | 41 | 0.045 | 0.050 | 0.051 | 0.051 |
| Example 9 | B | 5 | 23.9 | 0.1 | 42 | 0.032 | 0.037 | 0.038 | — |
| Example 10 | C | 1 | 26.1 | 0.1 | 39 | 0.029 | 0.034 | 0.034 | — |

(Note)
A: N-hydroxymethylaclrylamide
B: N,N'-methylenebisacrylamide
C: Divinylbenzene Since the porous polypropylene hollow fiber membranes of the present invention have a large pore diameter and a high potosity, they are suitable for use in such applications as precision filtration of liquids and air cleaning, and permit the design of very compact modules and systems. Moreover, since they are produced by a melt spinning process using no solvent, they are very clean materials and never contaminate the fluid being filtered.

Furthermore, the hydrophilized porous polypropylene hollow fiber membranes of the present invention have excellent hydrophilicity, exhibit good water permeability without being subjected to a hydrophilizing pretreatment with ethanol or the like, and show no substantial reduction in filtration performance. In addition, the hydrophilic material is firmly held on the pore surfaces, so that the amount of product of an ethylene-vinyl acetate copolymer held on at least a part of the pore surfaces thereof, the porous polypropylene hollow fiber membrane of large pore size having:
   (a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;
   (b) an average pore diameter ranging from 1.7 μm up to 10 μm as measured with a mercury porosimeter;
   (c) a porosity of 80 to 95%; and (d) an air permeability of not less than $4\times10^5$ $l/m^2.hr.0.5$ atm.

6. A hydrophilized porous polypropylene hollow fiber membrane as claimed in claim 5 wherein the saponification product of the ethylene-vinyl acetate copolymer is held physically.

7. A hydrophilized porous polypropylene hollow fiber membrane as claimed in claim 5 wherein the ethylene-vinyl acetate copolymer contains not less than 20 mole % of vinyl acetate units.

8. A hydrophilized porous polypropylene hollow fiber membrane as claimed in claim 5 wherein the saponification product of the ethylene-vinyl acetate copolymer is an ethylene-vinyl alcohol copolymer.

9. A hydrophilized porous polypropylene hollow fiber membrane as claimed in claim 8 wherein the ethylene-vinyl alcohol copolymer contains 5 to 60% by weight of ethylene units.

10. A hydrophilized porous polypropylene hollow fiber membrane comprising a porous polypropylene hollow fiber membrane of large pore diameter having a hydrophilic crosslinked polymer held on at least a part of the pore surfaces thereof, the hydrophilic crosslinked polymer being formed by polymerizing monomers including diacetone acrylamide and a crosslinkable monomer, the porous polypropylene hollow fiber membrane of large pore size having:

(a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;

(b) an average pore diameter ranging from 1.7 μm up to 10 μm as measured with a mercury porosimeter;

(c) a porosity of 80 to 95%; and (d) an air permeability of not less than $4\times10^5$ $l/m^2.hr.0.5$ atm.

11. A hydrophilized porous polypropylene hollow fiber membrane as claimed in claim 10 wherein the hydrophilic crosslinked polymer is held physically.

12. A hydrophilized porous polypropylene hollow fiber membrane as claimed in claim 10 wherein the proportions of the monomers are such that copolymerizable monomers including the crosslinkable monomer are used in an amount of 0.3 to 110 parts by weight per 100 parts by weight of diacetone acrylamide.

13. A hydrophilized porous polypropylene hollow fiber membrane as claimed in claim 10 wherein the crosslinkable monomer is a water-soluble crosslinkable monomer.

14. A hydrophilized porous polypropylene hollow fiber membrane as claimed in claim 10 wherein the hydrophilic crosslinked polymer is held in an amount of 0.5 to 100% by weight based on the porous polypropylene hollow fiber of large pore size.

* * * * *